3,050,148
Patented Aug. 21, 1962

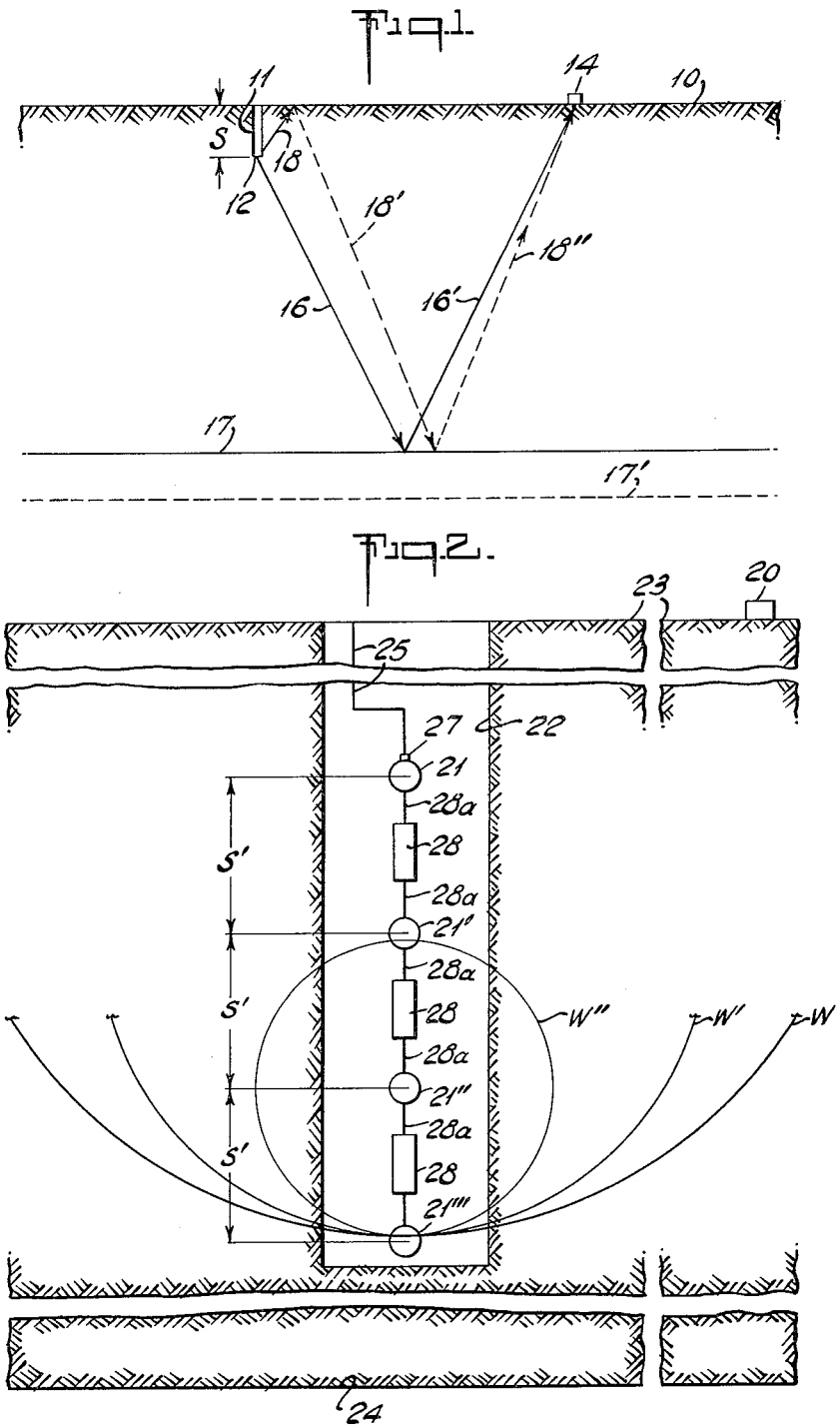

3,050,148
GEOPHYSICAL EXPLORATION
Burton D. Lee, Houston, Tex., assignor to Texaco Inc.,
a corporation of Delaware
Filed July 29, 1954, Ser. No. 446,625
5 Claims. (Cl. 181—.5)

This invention relates to geophysical exploration. More particularly, this invention relates to an improved method of geophysical exploration employing seismic waves.

In seismic reflection surveying the depths of underlying reflecting geophysical formations are determined by measuring the time intervals elapsed between the generation and reception of seismic waves which have been artificially created such as by exploding a charge of explosive beneath the surface of the earth.

In reflection seismic surveying, as it is usually practiced, a charge of explosive is set off at a point beneath the earth's surface known as the shot point. The shot point is most frequently located beneath the low velocity layer or so-called weathered layer which is an unconsolidated and aerated formation and exhibits seismic wave velocities of less than 5000 feet per second, frequently less than 2000 feet per second. After the explosion, the seismic waves emanating from the shot point and after having been reflected by the underlying strata are picked up by geophones. The geophones used to detect the reflected seismic waves are arrayed in any desired way depending upon local conditions and the type of information desired. Usually, the geophones are arrayed in line with the shot point and at or near the earth's surface and spaced from the shot point and from each other.

Geophones or seismic detectors are devices which are provided with means for converting the mechanical vibrations imparted to the earth by the seismic waves into electrical impulses. It is mentioned that the high frequency components of the seismic waves tend to be more quickly absorbed by the geological formations than the low frequency components. Low frequency components of the seismic wave, however, i.e., 20 cycles or less, are more often associated with the so-called clutter or surface traveling waves and random noise not connected with the explosion. Detection of the surface traveling waves and the random noise by the geophones is generally undesirable.

Each geophone is connected to a suitable electrical amplifying circuit and recording system. The utilization of the seismic records so produced to obtain information on the underlying strata in the area being explored is based on the fact that part of the seismic waves created by the explosion at the shot point travel downwardly into the earth and are reflected back to the geophones by the various geological formations. By observing the resulting record the existence, location and attitude of the underlying reflected subsurface formations can be determined.

The detection and identification of the reflected seismic waves on the resulting seismic record are difficult in the presence of the clutter and noise picked up by the geophones. Additional factors complicating the identification of the reflected seismic waves and the interpretation of the seismic records are the influences exhibited by the varying physical characteristics of the underlying reflecting geological formations. Depending upon the acoustical contrast between adjacent underlying formations the reflected seismic waves will vary in strength.

On the seismic record oftentimes there are indicated two distinct seismic waves, a so-called direct reflected wave and a so-called ghost reflected wave which in a single shot explosition trails the direct reflected wave by twice the time required for the seismic wave to travel from the point of the explosion to the upper reflecting surface giving rise to the ghost reflected wave. It is apparent, therefore, as a result of this situation the seismic record is actually an interference pattern between the direct reflected wave and the recorded ghost reflected wave. Also, it is not unusual that the delayed ghost reflected wave may have essentially the same amplitude as the direct reflected wave.

Various techniques have been proposed for increasing the strength or amplitude of the direct reflected wave so that it may be more readily detected and identified on the seismic record, see U.S. Patents 1,998,412; 2,556,299; 2,601,522; and 2,609,885. In general it has been proposed to create a strong, substantially unidirectional, initially downwardly directed seismic wave which, when reflected by the underlying geological formations and detected by the geophones, will be of sufficient strength as to prominently stand out and be readily identified on the seismic record. For example, it has been proposed to explode downwardly in a shot hole a continuous spiral length of explosive at a velocity equal to the seismic velocity in the formation traversed by the shot hole so that as the seismic wave propagates downwardly its strength is increased in the downward direction. It has also been proposed to detonate a plurality of spaced explosive charges within the shot hole so as to produce a reinforced downwardly directed seismic wave.

This invention particularly relates to a seismic exploration operation wherein a plurality of seismic waves are created so as to produce a reinforced directional seismic wave moving in a desired direction and a resulting plurality of separate lesser seismic waves moving in another direction such as in the opposite direction. The practice of this invention is particularly applicable to a seismic exploration operation wherein a plurality of vertically spaced explosive charges is positioned within the shot hole and progressively detonated so as to create a single reinforced seismic wave initially moving in one direction, such as downwardly from the shot hole, and a plurality of separate lesser seismic waves initially moving in another direction, such as upwardly from the shot hole, and wherein the charges are so spaced and progressively detonated that the time-phase relationship between the resulting lesser seismic waves is such that these lesser waves substantially cancel each other. This particular method of seismic exploration is more completely described in copending patent application Serial No. 424,200 filed April 19, 1954, now U.S. Patent No. 2,908,342, of which application I am a co-inventor, the disclosures of which are herein incorporated and made a part of this disclosure.

It is an object of this invention to provide an improved method of seismic exploration.

It is another object of this invention to provide a method of seismic exploration whereby an improved seismic record is obtainable.

It is another object of this invention to provide an improved method of seismic exploration wherein a plurality of vertically spaced explosive charges is progressively downwardly detonated at a velocity equal to the velocity of the formation traversed by said charges as to produce an initially downwardly directed reinforced seismic wave associated with a resulting plurality of separate lesser seismic waves initially moving in an upward direction.

In at least one embodiment of this invention at least one of the above-indicated objects will be attained.

These and other objects of this invention and how they are accomplished will become apparent in the light of the accompanying disclosure and drawing wherein:

FIG. 1 is a diagrammatic sketch showing the paths of various seismic waves which are received by a geophone;

FIG. 2 is a diagrammatic view of a vertical section of the earth showing the wave front of a plurality of seismic waves at a given instant and is illustrative of one embodiment of the practice of my invention.

It has been discovered that the method of seismic exploration wherein a plurality of seismic waves is created to produce a reinforced directional seismic wave in one direction with the resulting production of a plurality of lesser seismic waves in the opposite direction is improved by so creating said plurality of seismic waves by detonating a plurality of explosive charges wherein the size of the charges producing these lesser seismic waves is proportional in sequence to the square root of the corresponding numerical coefficients of the binomial expansion $(x+y)^n$ wherein $n$ is any whole number having a value of at least 2 and sufficient to provide the same number of numerical coefficients resulting from the aforesaid expansion as there are charges. In a particular application of this invention it has been discovered that in a seismic exploration method adapted to produce a strong reinforced seismic wave in a desired direction and a plurality of less strong separate seismic waves in another direction, such as in the opposite direction, which substantially cancel each other out on the seismic record, by positioning a plurality of spaced apart explosive charges along a selected position, such as within a shot hole, and progressively detonating each charge in sequence so that each charge when detonated contributes to and augments a seismic wave initially moving in one direction and so that the resulting plurality of separate lesser seismic waves moving in another direction, such as in the opposite direction, are spaced in time relative to each other so that these resulting separate lesser seismic waves substantially cancel each other, improved results are obtained by employing charges the weights of which are proportional in sequence to the square root of the corresponding numerical coefficients of the binomial expansion $(x+y)^n$ wherein $n$ is any whole number greater than two, such as in the range 2–10, preferably 4. It is realized that $n$ should have a value sufficient to supply the same number of numerical coefficients as there are separate charges in the plurality of charges to be sequentially detonated. The above-mentioned numerical coefficients may be arranged in Pascal's triangle.

| Numerical Coefficients | Value of $n$ |
| --- | --- |
| 1 | 0 |
| 1 1 | 1 |
| 1 2 1 | 2 |
| 1 3 3 1 | 3 |
| 1 4 6 4 1 | 4 |
| 1 5 10 10 5 1 | 5 |
| 1 6 15 20 15 6 1 | 6 |
| 1 7 21 35 35 21 7 1 | 7 |
| 1 8 28 56 70 56 28 8 1 | 8 |

Accordingly, in an array of 5 charges (where $n$ is equal to 4) the size distribution of the charges would be 1:2:2.45:2:1. Likewise in an array of 4 charges (where $n$ is equal to 3) the charge distribution would be 1:1.73:1.73:1. Similarly in an array of 6 charges (where $n$ is equal to 5) the charge distributon would be 1:2.24:3.16:3.16:2.24:1.

The rate at which the plurality of spaced charges is detonated to produce a seismic wave in the desired direction, such as up or down, is controlled by the seismic velocity or speed of sound of the formation surrounding the spaced charges. Accordingly, assuming an initial detonation which creates an initial seismic wave the next detonation takes place when the initial wave reaches the charge adjacent the initially detonated charge. As a result of the in-phase relationship at that instance of the initial seismic wave and the seismic wave created by the detonation of the adjacent charge there is produced a resultant seismic wave which has a substantially increased strength or amplitude. Accordingly, assuming $n$ separate charges of equal weight are so detonated, the final desired reinforced seismic wave will have an amplitude substantially $n$ times that of the initial seismic wave.

At the same time the reinforced seismic wave is being produced in the desired direction a plurality or series of lesser seismic waves initially moving in another direction is produced. It is desirable that these lesser seismic waves should substantially cancel each other and/or be submerged in the seismic record so as not to interfere or distort the desired reflected reinforced seismic wave. A method for substantially mutually cancelling these separate lesser seismic waves has been proposed in the above-referred patent application by controlling the time-phase relationship of each of the separate lesser seismic waves so that at a fixed point the onset of each succeeding lesser seismic wave occurs at about the initial maximum amplitude of its immediately preceding separate lesser seismic wave. The practice of this invention is applicable to further improve this method so as to bring about an improved mutual cancellation of these separate lesser seismic waves by adjusting the weights of the charges in the above-described manner.

Referring now to FIG. 1 of the drawing, the surface of the earth is shown at 10. Into the earth there is provided a shot hole 11 which extends beneath the surface 10 a distance S. In a seismic exploration operation in the conventional manner a charge of high explosive is detonated at point 12. A seismic wave is created by the seismic explosion and travels outwardly in all directions from point 12. A geophone 14 located on the surface 10 some distance from shot hole 11 receives and detects the seismic waves generated by the explosion. The seismic waves received and detected by the geophone 14 include the reflected wave moving along the path 16' which wave was created by the reflection of the seismic wave created at shot point 12 and moving along the path 16 and striking the subsurface reflecting horizon 17. The seismic wave indicated by the combined wave paths 16—16' may be referred to as the direct reflected wave. Also included is the initially upwardly directed seismic wave which moves along the path 18 until it hits some overlying reflecting horizon such as the air-ground interface 10 or the bottom of the weathered or low velocity layer. Upon reaching the surface 10 a substantial part of the seismic wave travelling along the path 18 is reflected back into the earth along the path indicated by the dashed line 18'. This reflected wave 18' in turn is in part reflected by the subsurface reflecting horizon 17 back to the geophone 14 along the path 18". The seismic wave indicated by the combined wave paths 18—18'—18" may be referred to as the ghost reflected wave or the ghost wave.

It is apparent from FIG. 1 that the ghost reflected wave will trail the direct reflected wave at the geophone by about the time interval given by the equation $$\Delta t = \frac{2S}{V}$$

where $\Delta t$ is the time delay between the direct reflected and ghost waves in seconds, S is the distance in feet from the point of explosion to some overlying reflecting horizon such as the air-ground interface and V is the average velocity in feet per second of the seismic wave as it traverses the distance S.

Depending upon the value of the time interval $\Delta t$ the spacing on the seismic record between the direct reflected wave and the ghost reflected wave may be such as to give rise to an interpretation that two subsurface reflecting horizons 17 and 17' are present. Also, the time interval may be such that the direct reflected wave is so interfered with by the ghost wave as to be unrecognizable on the seismic record.

Referring now to FIG. 2 of the drawing which illustrates one embodiment of the practice of our invention, there is illustrated a plurality of vertically spaced explosive charges, 21, 21', 21" and 21''', which are suitably positioned in a shot hole 22. An upper reflecting horizon and a lower reflecting horizon are indicated by the reference numerals 23 and 24, respectively. A geophone 20 is shown positioned spaced apart from the shot hole 22 by a suitable distance. Charge 21 is connected to blasting wire 25 which at its upper end is connected to a voltage source such as a battery or blasting machine, not shown. The other end of the blasting wire 25 is connected to electric blasting cap 27 which serves to detonate charge 21. Suitable explosive time delay elements interconnect charges 21—21′, 21′—21″ and 21″—21‴ and serve to transmit the detonation wave from one charge to another. These time delay elements may comprise lengths 28a of Primacord which has a detonation velocity in the neighborhood of 20,000 ft. per sec., interconnected by means of one or more explosive time delay units 28 which are available for various time delays, such as 0.001 sec., 0.002 sec., 0.0025 sec., 0.003 sec., etc. Depending upon the desired time delays between successive charges, a suitable number or type of time delay unit is employed. Other suitable methods of obtaining the desired time delay between successive detonations may be used.

When the firing voltage is applied to wire 25 the blasting cap 27 is fired and the explosive charge 21 is detonated. The detonation wave resulting from the firing of charge 21 is transmitted along the Primacord 28a through the explosive time delay unit 28 and thence by means of additional Primacord to charge 21′. In a like manner charges 21″ and 21‴ are subsequently detonated.

In the embodiment illustrated in FIG. 2 it is desired to produce a reinforced initially downwardly directed seismic wave. This is accomplished in the manner to be described. Explosive charge 21 is the first to be detonated. With the detonation of charge 21 a seismic wave is created and travels outwardly in all directions in the practice of this embodiment of my invention are the substantially downward directed portion and the substantially upward directed portion of the seismic wave. The seismic wave created by the detonation of charge 21 will move outwardly at a velocity equal to the seismic velocity of the formation or medium surrounding the charge 21.

The seismic velocity of the medium surrounding the shot hole and through which the seismic wave travels can be determined by various methods. One convenient method of determining the seismic velocity involves positioning a number of vertically spaced apart geophones within the shot hole. An explosive charge is then detonated at the top of the shot hole slightly off to one side. The time of arrival of the seismic wave at each of the geophones is then measured and from this information, knowing the distance of each geophone from the exploded charge, it is a relatively simple matter to calculate the velocity of the seismic wave as it travels down through the formations surrounding the shot hole to the geophones.

Knowing the effective seismic velocity and the distance separating each of the spaced charges, the time delay between the detonation of each of the spaced charges can be calculated so that the detonation of each charge takes place at substantially the instant the initially downward moving seismic wave reaches each charge. For example, assuming a seismic velocity of 5,000 feet per second and a charge spacing of 10 feet a time delay of .002 second between the charges is required in order to reinforce the seismic wave in the downward direction.

When the charges 21, 21′, 21″ and 21‴ are fired in the above indicated manner a reinforced downwardly directed wave is produced. This reinforced seismic wave is approximately four times as strong as the initial seismic wave created by the detonation of the charge 21 since the phase relationship of each newly created seismic wave with respect to the downward moving seismic wave is such as to augment each other.

It is to be observed however, as indicated in FIG. 2 which illustrates the position of the seismic wave fronts W, W′ and W″, resulting from the detonation of charges 21, 21′ and 21″, respectively, at the instant charge 21‴ is detonated that since each detonation creates a seismic wave which moves radially outward in all directions, each detonation also creates an initially upward directed seismic wave which moves in the opposite direction to the reinforced downward directed seismic wave. These individual upward directed seismic waves, however, will not be in time-phase coincidence. Actually as indicated in FIG. 2, the time interval $\Delta t$ between each upward directed seismic wave front will be substantially equal to twice the distance S′ separating each spaced charge divided by the seismic velocity $V_f$ of the formation in which the wave is traveling, as given by the equation $$\Delta t = \frac{2S'}{V_f}$$

The distances S′ separating each of the spaced charges may not be the same depending upon the velocities of the formation traversed by the shot hole.

It is desirable that the time-phase relationship of these individual upward directed seismic waves be such that they substantially cancel each other. This desired mutually time-phase cancelling relationship of the individual initially upward moving seismic waves is obtained by spacing the individual explosive charges relative to each other so that at a fixed point the onset of each succeeding initially upward moving seismic wave occurs at the instant the immediately preceding initially upward moving seismic wave reaches its initial maximum amplitude.

In applying the practice of this invention to the above-described method improved results are obtained when charges 21, 21′, 21″, and 21‴, have the following weight distribution 1:1.73:1.73:1.

The advantages obtainable in the practice of this invention have been demonstrated by actual field tests made at Wadsworth, Matagorda County, Texas. Seismic records were obtained by conventional single shot explosions and by a sequential shooting technique wherein all the charges sequentially detonated had the same weight. The records so produced were compared with records obtained by employing sequentially detonated charges having a weight distribution in accordance with the practice of this invention. The pulse heights of the resulting reflected waves were measured in each instance and compared with each other. In a single shot explosion (8 pounds of high explosive), the reflected seismic wave pulse height had a value of 0.54 unit. In the test involving the sequential detonation of four 2 lb. charges (total charge weight eight pounds), the pulse height of the direct reflected wave had a valve of 1.18 units. In the sequential shooting tests in accordance with this invention wherein five charges were sequentially detonated, charge distribution 1:2:2.5:2:1 (total charge weight 8½ pounds) the pulse height of the reflected direct wave had a value of 1.75 units. A percentage increase of 224% over the single shot explosion having substantially the same total weight of explosive and an increase of 48% over almost the same weight of equally distributed sequentially detonated charges.

Although this invention has been described with reference to a preferred embodiment, that is, downward sequential shooting, it is pointed out that the practice of this invention is also applicable to upward sequential shooting, that is, where initial detonation is started at the bottom of the charge array.

Referring again to FIG. 1 it is to be noted that the ghost reflected wave will be recorded on the seismic record at some time later than the direct reflected wave. This same relationship holds true for downward sequential shooting in which the reinforced seismic wave is the direct reflected wave. In upward sequential shooting however the so-called ghost wave will be the reinforced seismic wave and will appear prominently on the seismic record and contain the desired intelligence relative to the underlying subsurface formations, being preceded by the relatively weak substantially cancelled direct reflected waves. Upward sequential shooting and its applicability to seismic exploration is more fully disclosed and described in my co-pending patent application Serial No. 432,971, filed May 28, 1954, now abandoned, of which I am a co-inventor.

In the practice of my invention it is desirable to employ a number of sequentially detonated charges, preferably at least three, so that the reinforced seismic wave has an amplitude sufficient to overcome and submerge in the seismic record the separate initially oppositely directed seismic waves which are associated in relatively close time relationship with the reinforced wave. A number of spaced charges in the range 4–10 is usually sufficient. It has also been observed that the length of the charge array, usually dependent on the number of charges employed, increases the directivity of the reinforced wave. The weight of the terminal charges in an array is preferably in the range $\frac{1}{4}$ to 25 pounds, although smaller or larger size charges may be employed depending upon local conditions. As indicated it is preferred to detonate an initial single charge in the area to be explored in order to determine the seismic wave form characteristic of that area. This characteristic seismic wave form can conveniently be determined, if desired, at the same time the seismic velocity of the shot hole formation is determined in the manner described hereinabove. This initial determination of the seismic wave form is not absolutely necessary in the practice of our invention since an excellent approximation of the characteristic seismic wave form can be arrived at based upon prior experience in the area or by empirical methods.

Various other methods, other than the method described with respect to FIG. 2 can be employed for sequentially detonating a plurality of spaced charges in the desired time sequence. For example, each charge to be detonated can be provided with an electric blasting cap containing a suitable time delay element, each time delay element being successively greater from one end of the charge array to the other. Accordingly when the firing voltage is simultaneously impressed upon each of the electric caps the detonation of each of the charges is then controlled by the time delay element associated therewith. This technique avoids the use of Primacord to carry the detonation wave from charge to charge. Another suitable method would comprise employing a fuse or detonator associated with each of the spaced charges and responsive to the seismic wave. Each charge would then be exploded at about the instant the seismic wave reaches each charge. Another suitable method particularly applicable to upward sequential shooting is to employ a precision sequence timer to electrically detonate each charge in desired time sequence. In downward firing the firing wires leading to the timer-blaster could be protected from the explosion by being run through a tubing or pipe adjacent the charges detonated.

As will be apparent to those skilled in the art upon reading this disclosure many modifications, substitutions and changes which do not depart from the spirit and scope of this invention are possible.

I claim:

1. In seismic surveying wherein explosive charges are detonated in a bore hole to generate seismic waves in the earth, in combination with at least three explosive charges spaced apart vertically in said bore hole, means operatively associated with said explosive charges for detonating said charges in time sequence at a velocity substantially equal to the seismic velocity of the medium surrounding said bore hole, in order to produce a reinforced seismic wave moving in the direction as determined by said sequential detonation and a plurality of lesser seismic waves moving in the opposite direction, and means spacing said explosive charges a distance apart such that said lesser seismic waves will pass a given point in substantially complete phase opposition each with respect to the preceding wave so as to cancel the effects thereof traveling in said opposite direction, the improvement comprising the relative strengths of said explosive charges being proportional to the square root of the corresponding numerical coefficients of the binomial expansion $(x+y)^n$ wherein $n$ is a whole number having a value of at least two and sufficient to provide the same number of numerical coefficients resulting from the aforesaid binomial expansion as there are charges.

2. The invention according to claim 1 wherein the number of said explosive charges lies in the range of 3 to 10 inclusive.

3. The invention according to claim 2 wherein the strength of said explosive charges lies in the range of $\frac{1}{4}$ lb. to 25 lbs.

4. The invention according to claim 3 wherein the number of said explosive charges is 4.

5. The invention according to claim 3 wherein the number of said explosive charges is 5.

References Cited in the file of this patent

UNITED STATES PATENTS

| | | |
|---|---|---|
| 1,998,412 | Prescott | Apr. 16, 1935 |
| 2,556,299 | Scott | June 12, 1951 |
| 2,698,927 | Parr | Jan. 4, 1955 |
| 2,770,312 | Silverman | Nov. 13, 1956 |
| 2,808,894 | Eisler et al. | Oct. 8, 1957 |

OTHER REFERENCES

Shock: "Progressive Detonation of Multiple Charges in a Single Seismic Shot," Geophysics magazine, vol. XV, No. 2, April 1950, pages 208–218.